Jan. 17, 1950  E. J. SVENSON  2,494,841
FLUID POWER CONTROLLING MEANS AND
ASSOCIATED MECHANISMS THEREFOR
Filed Nov. 10, 1941  9 Sheets-Sheet 2

INVENTOR.
ERNEST J. SVENSON
BY
Moore, Olson & Trexler

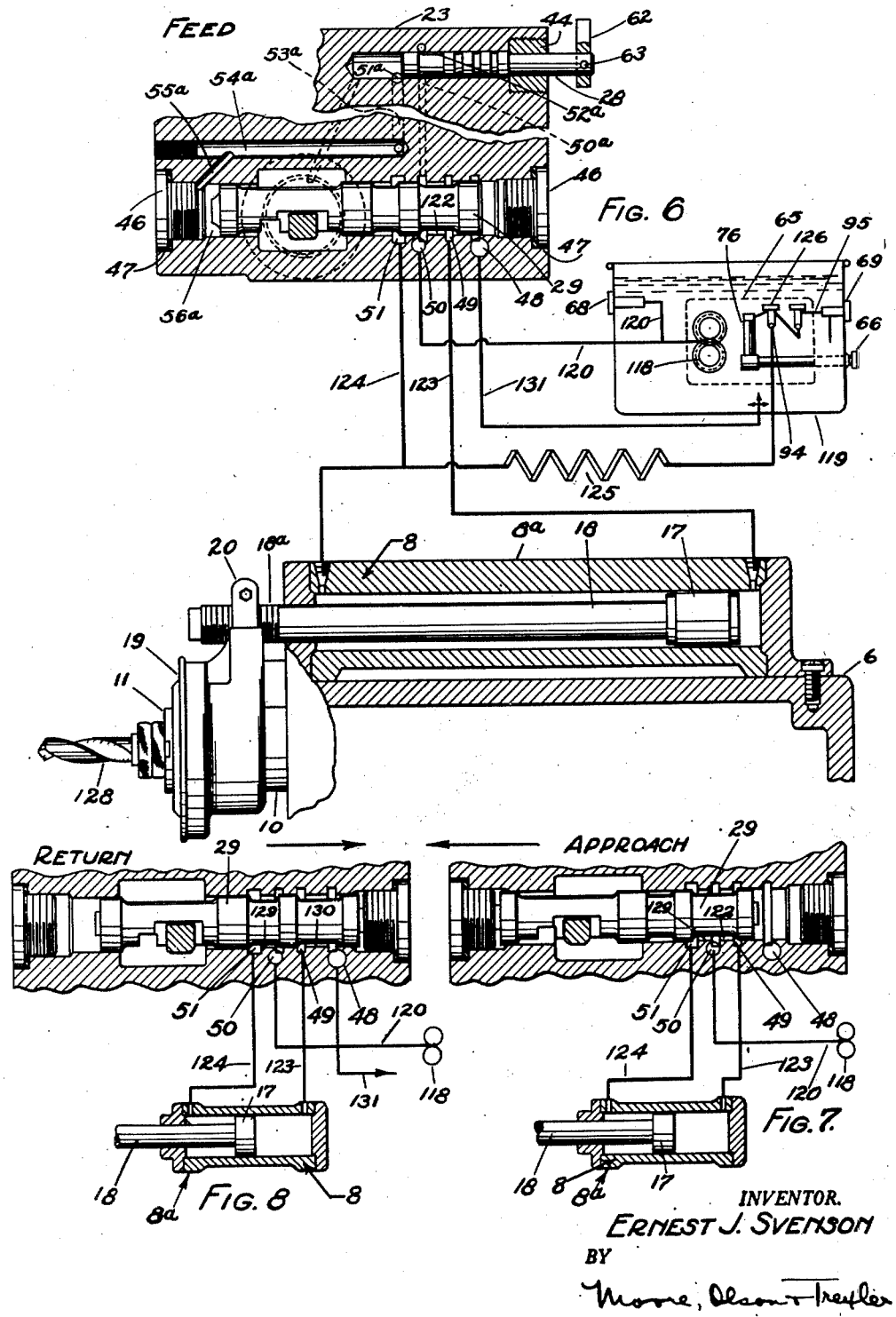

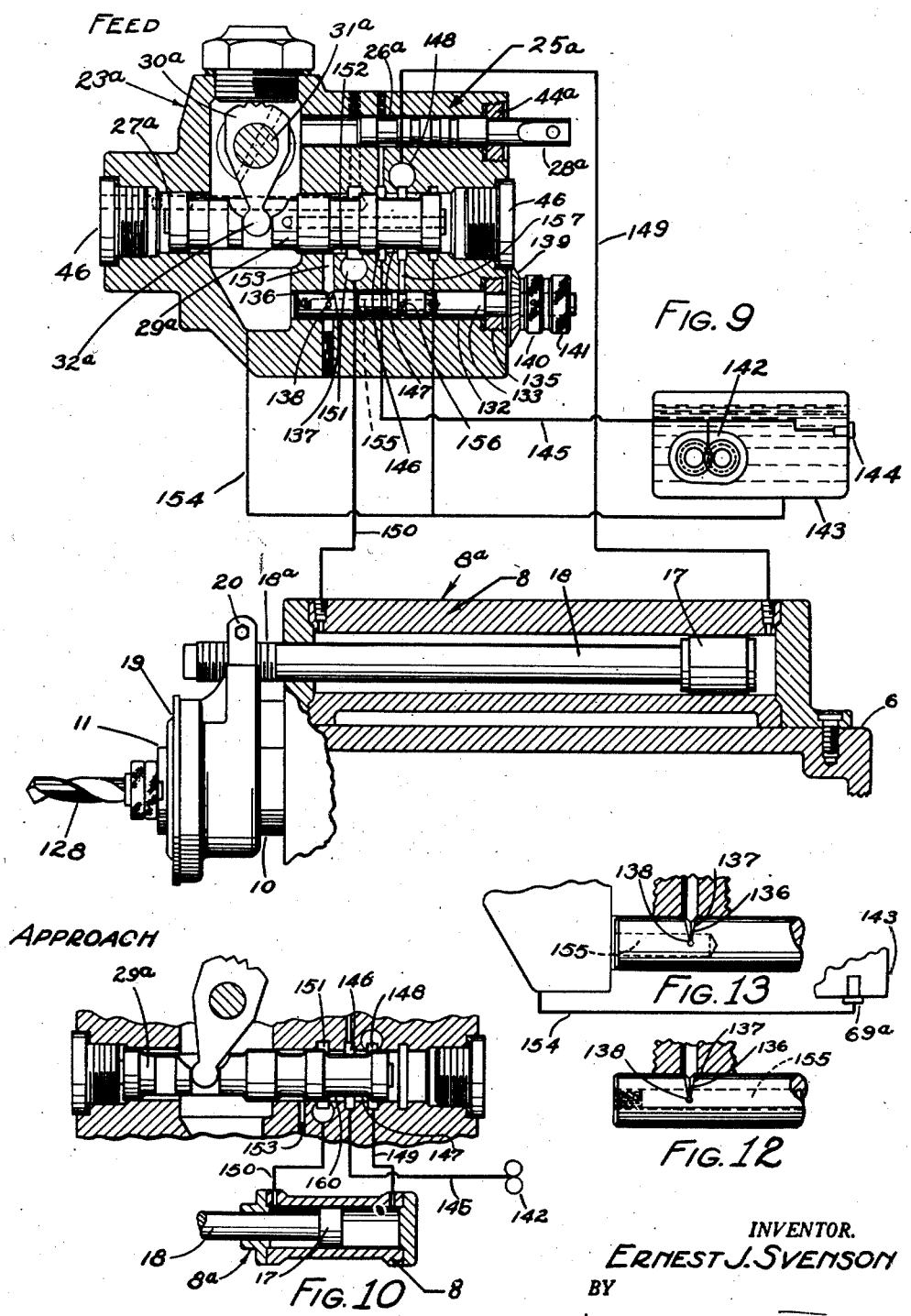

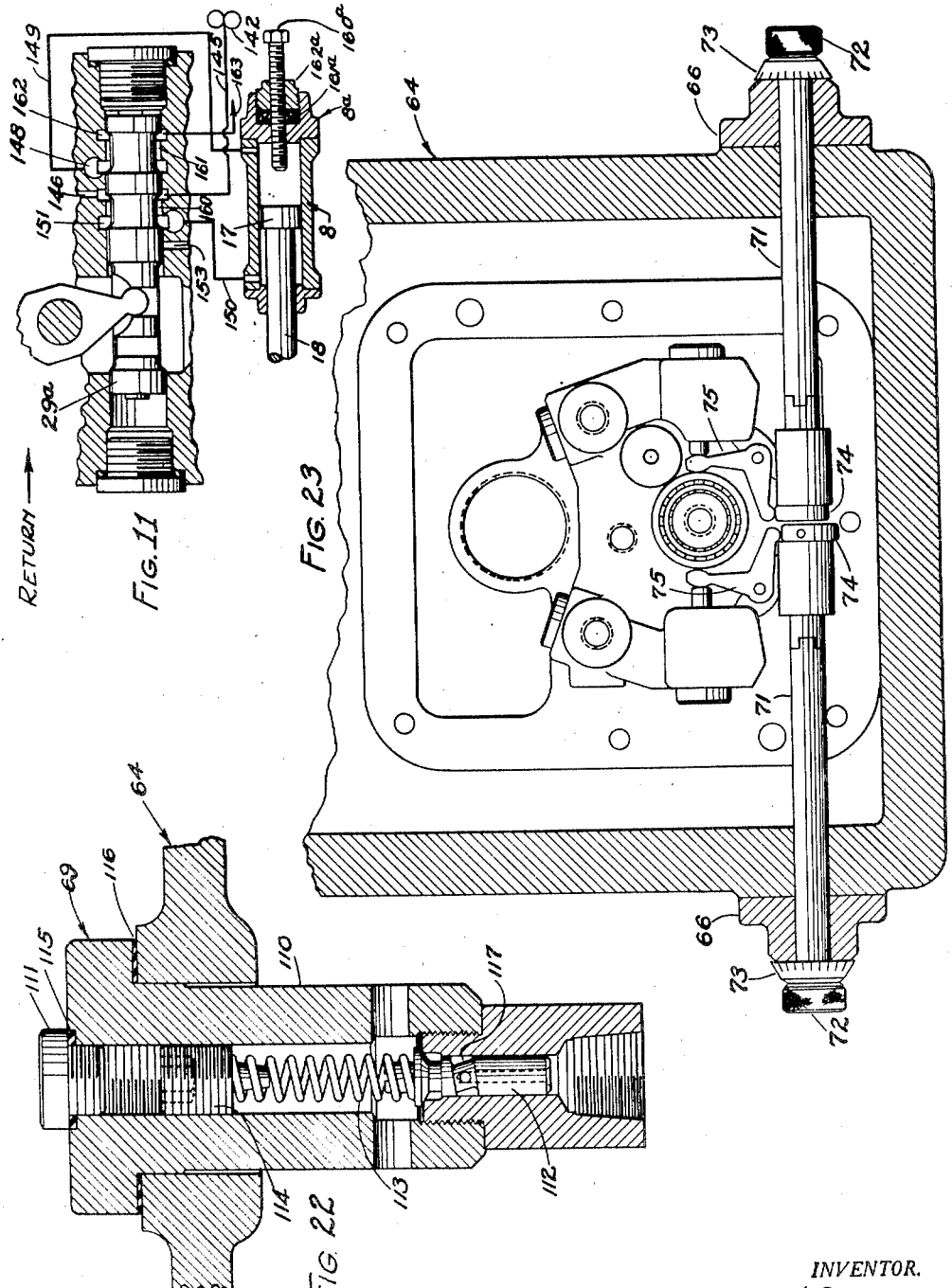

Patented Jan. 17, 1950

2,494,841

UNITED STATES PATENT OFFICE 2,494,841

FLUID POWER, CONTROLLING MEANS AND ASSOCIATED MECHANISMS THEREFOR

Ernest J. Svenson, Rockford, Ill., assignor to Odin Corporation, Chicago, Ill., a corporation of Illinois Application November 10, 1941, Serial No. 418,576

10 Claims. (Cl. 60—52)

My invention relates generally to fluid power, controlling means and associated mechanisms therefore, more particularly to fluid transmissions for metal working machines and fluid power actuated devices.

The use of fluid power transmissions, coupled with various electrical and mechanical controls for propelling and controlling machine elements and the like has, during the last ten, or possibly fifteen years, completely revolutionized the methods of metal cutting and machine design, employed in industries of high production, particularly in the manufacture of automobiles, farm implements and electrical structures in general, also house-hold utensils and like manufacture. In earlier applications and patents, for example: Svenson application, Serial No. 391,130, filed September 9, 1929, now Patent Number 2,372,692, issued April 3, 1945, I have pointed out certain improvements made in fluid power systems and control. The present invention is a further improvement pertaining to fluid power systems and control.

More particularly, my invention contemplates the further application of fluid power transmissions to structures and devices heretofore operated and controlled mechanically or manually.

Another object of the present invention is to provide in a machine tool and other structures, a fluid power system and control therefore including a simplified control valve structure, wherein the complete control of the speed of the fluid delivery and the direction of the fluid flow is incorporated in a small, compact, unitary structure. Further, the control valve proper is adaptable for association with various types of structure to be actuated not suitable for control valves available heretofore.

A further object of my invention is to provide fluid flow control means to govern the speed of travel of a fluid actuator by controlling the speed of the fluid flow removal from the return side of the fluid actuator. Said fluid is of a less volume than used for propelling the actuator.

Still further, another object of my present invention is to provide a fluid power transmission structure, wherein the fluid power generating means are remotely positioned pertaining to the location of the actuated member or members.

More specifically, my present invention contemplates the use of a simplified fluid power generating mechanism for the speed control means; and further, the arrangement of a fluid power conduit of a selected length and design, said conduit so constructed and located in relation to the fluid power generating mechanism and the fluid power actuator as to only require a single piston or like arrangement for control means, as later on set forth.

Still more specifically, my invention contemplates modifying the impulse generated by the action of a single piston in such a manner as to obtain a suitable smooth movement of said fluid power actuator. This impulse phenomenon is related to the velocity of sound when transmitted by various material. The compressibility of metal, steel and fluid—such as oil, is fully explained later on in the specification.

In carrying out the last said object, I propose to employ a combined fluid power generating mechanism, arranged to maintain continuous, preselected and adjustable pressure to shift a plurality of fluid power actuators either in timed relation to each other or independently of each other. That is, a plurality of fluid power actuators may be suitably propelled and timed solely depending upon the requirement of the selected type of the indexable work holder or holders.

It is a still further object of my invention to provide a fluid power generating structure for controlling the speed of travel of a plurality of fluid power actuators individually or in unison as the case may be.

Still further, an object of my present invention is to provide a very small and inexpensive fluid power generating structure for controlling the speed of travel of a plurality of fluid power actuators of the differential type, constructed with a minimum of fluid power control area, as set forth later.

Another object of my present invention is to provide a fluid flow control, selectably coupled with the return end of the fluid power actuator and directing the fluid flow to the propelling end of said actuator in combination with a differential type fluid power actuator.

Still another object of my invention relates to a specific differential fluid power actuator, coupled with a novel valve structure in a manner as to utilize in a selected direction the fluid flow from the return side of the fluid actuator as an added fluid power propelling medium. Further, at a selected speed of actuator travel the above-mentioned specific differential fluid power actuator directs the fluid flow from the return side of the fluid actuator to a single piston in the fluid power generating structure and thereby selectively controls the speed of travel of the actuator.

As a still further object, I propose to employ an orifice fluid control for selected relatively rapid controlled speed of the fluid actuator; and for relatively slow controlled speed of travel of the fluid actuator, I propose the use of a reciprocating piston for speed control of the actuator.

A still further object of my invention is to provide in association with a novel fluid actuator structure a fluid flow control orifice between the propelling side and the return side of the fluid actuator as set forth in the specification to follow.

The purposes of the foregoing objects are, among other things, to facilitate the reading of and understanding of the structural detail explanation. Numerous other objects follow, and I hereby direct attention to the fact that objects above set forth are not in any manner descriptive of the complete invention. The novel structures are more clearly understood by following the detail explanations of the various structures and drawings wherein:

Figure 4 is a front view of the fluid power panel unit.

Figure 5 is a "rolled out" disclosure of the panel shown in Figure 4.

Figure 6 is a diagrammatical disclosure of the feed and rapid traverse valve with the main control stem in feed position associated with the fluid motor and the pumping mechanism.

Figure 7 is a fragmentary sectional representation of the valve as disclosed in Figures 2 and 3; the main control stem being shown in its rapid approach position associated with the fluid motor.

Figure 8 is a fragmentary sectional representation of the valve as disclosed in Figures 2 and 3; the main control stem being shown in its return or reverse position associated with the fluid motor.

Figure 9 is a diagrammatical disclosure of the orifice feed and rapid traverse valve with the speed control orifice and the main control stem in feed position associated with the fluid motor and the pumping mechanism.

Figure 10 is a fragmentary sectional representation of the valve as disclosed in Figure 9, the main control stem being shown in its rapid approach position associated with the fluid motor.

Figure 11 is a fragmentary sectional representation of the valve as disclosed in Figure 9; the main control stem being shown in its return or reverse position associated with the fluid motor.

Figure 12 is a fragmentary enlarged partial view of the speed control stem showing the speed control orifice.

Figure 13 is another fragmentary enlarged partial view of the modified speed control stem showing the speed control orifice.

Figure 17:
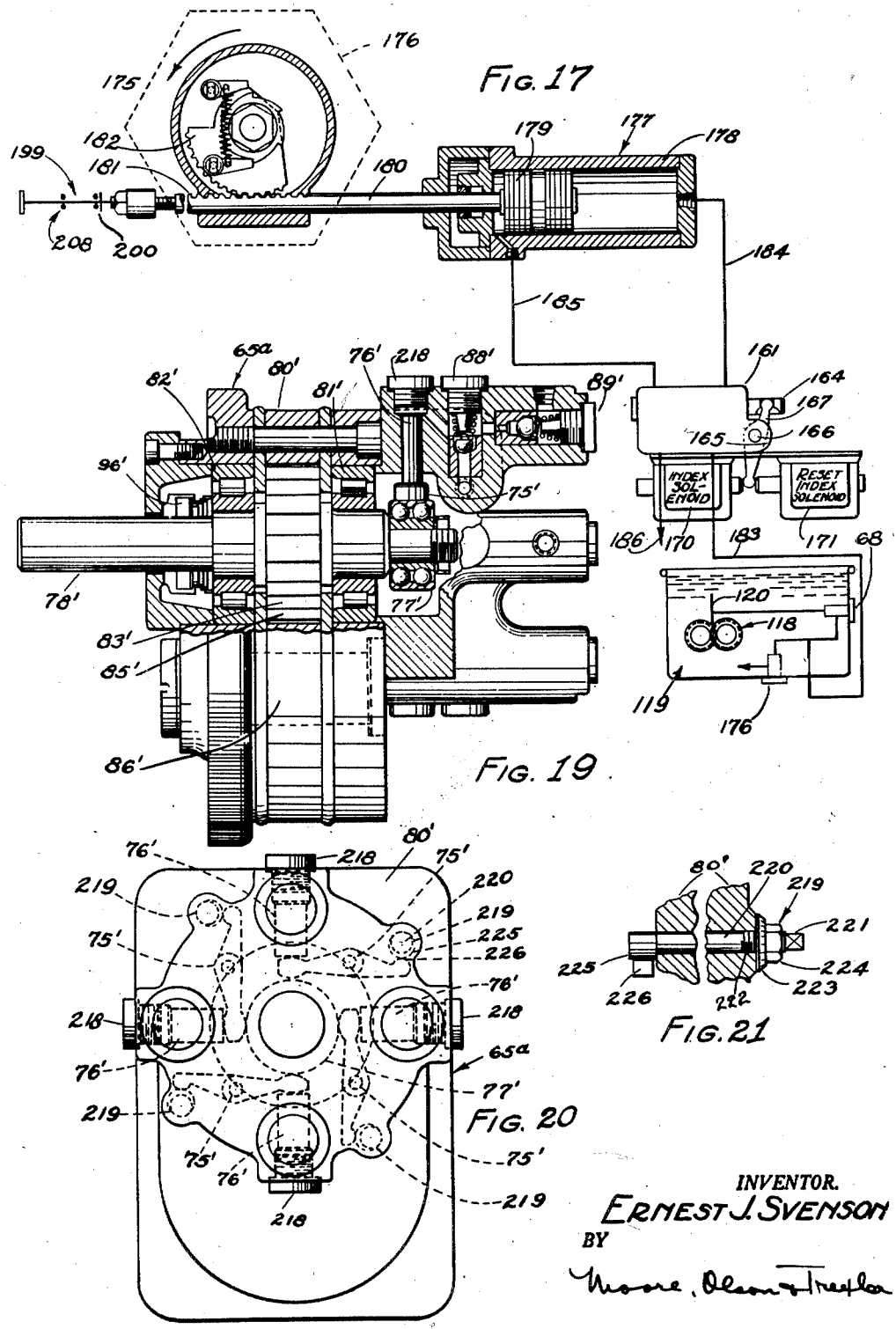

Figure 17 discloses a fluid circuit arrangement associated with an indexing mechanism.

Figure 16:
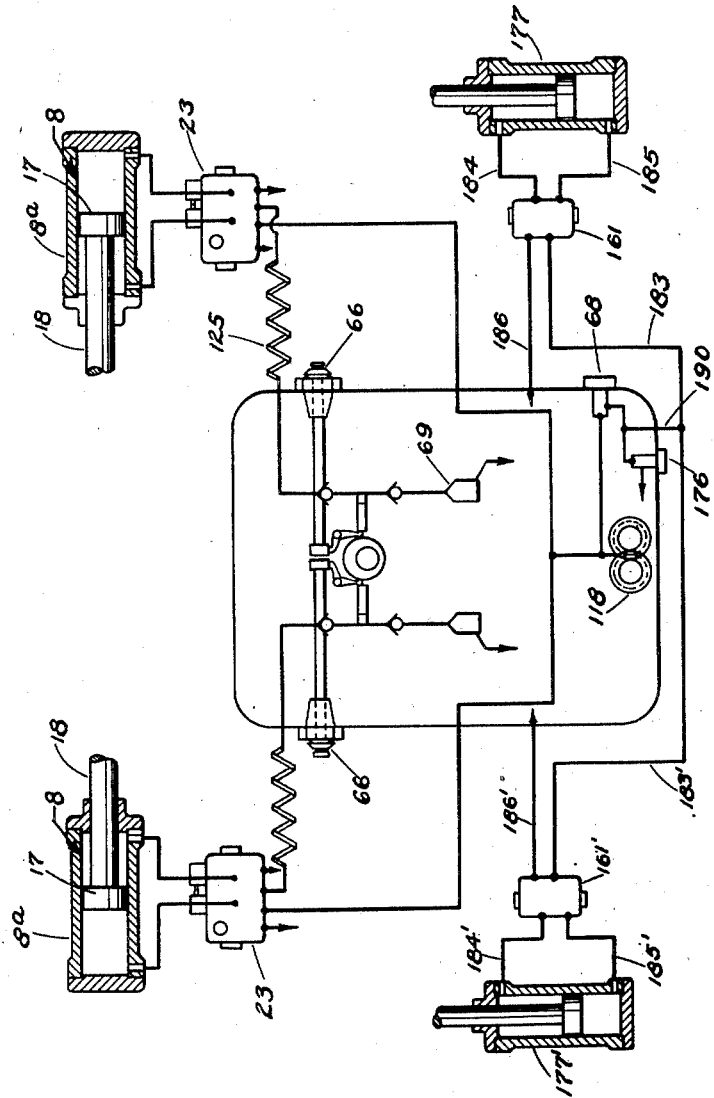
Figure 16 is a diagrammatical disclosure of the fluid system and diverting control shown in association with a plurality of actuators.
Figure 18:
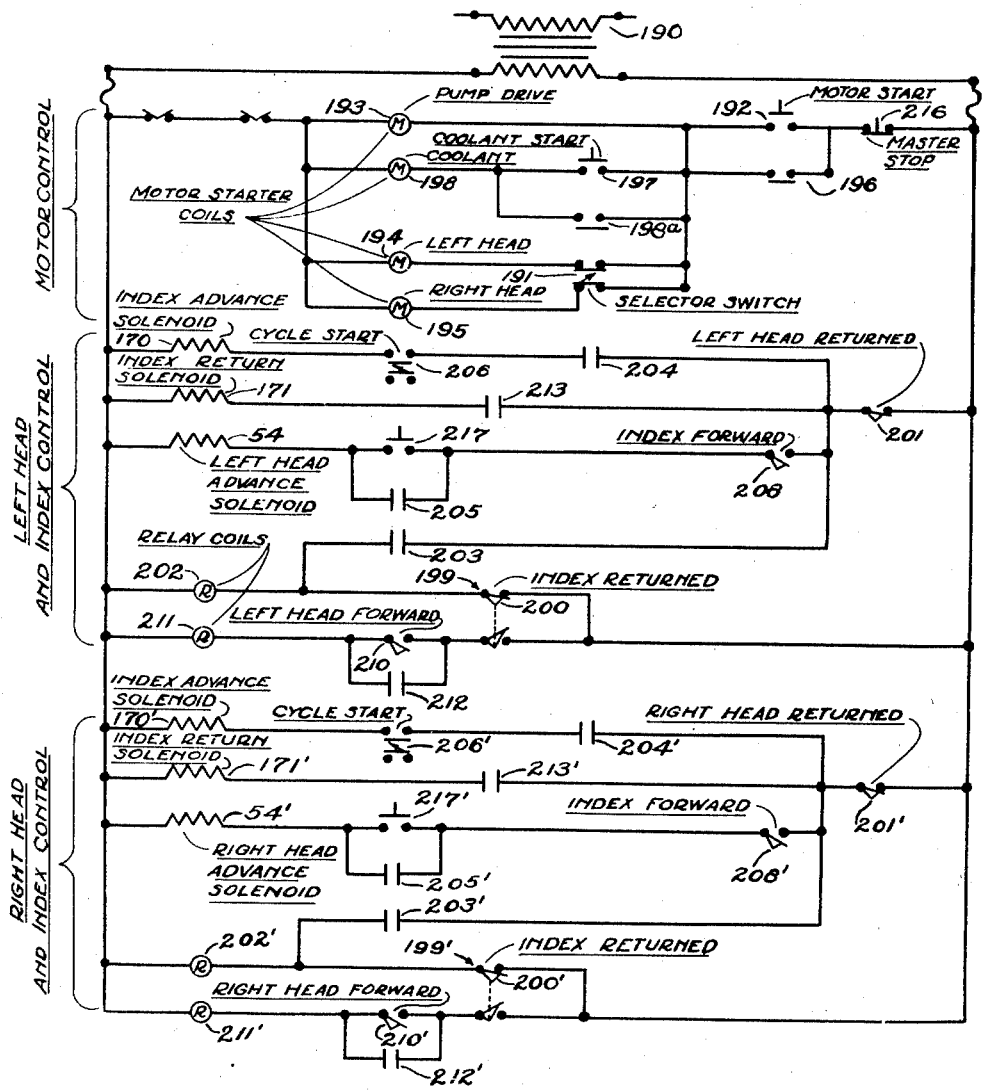

Figure 18 is a diagram of the electrical circuit employed to control the fluid system disclosed in Figure 16.

Figure 19 is a partial sectional view of a certain type of multiflow pump means.

Figure 20 is a right hand end view of Figure 19.

Figure 21 is a fragmentary enlarged view of the piston adjusting mechanism as shown in Figure 20.

Figure 22 is an enlarged sectional view of the relief valve disclosed in Figure 5.

Figure 23 is an enlarged view of the adjusting mechanism disclosed in Figure 4.

Figure 1:
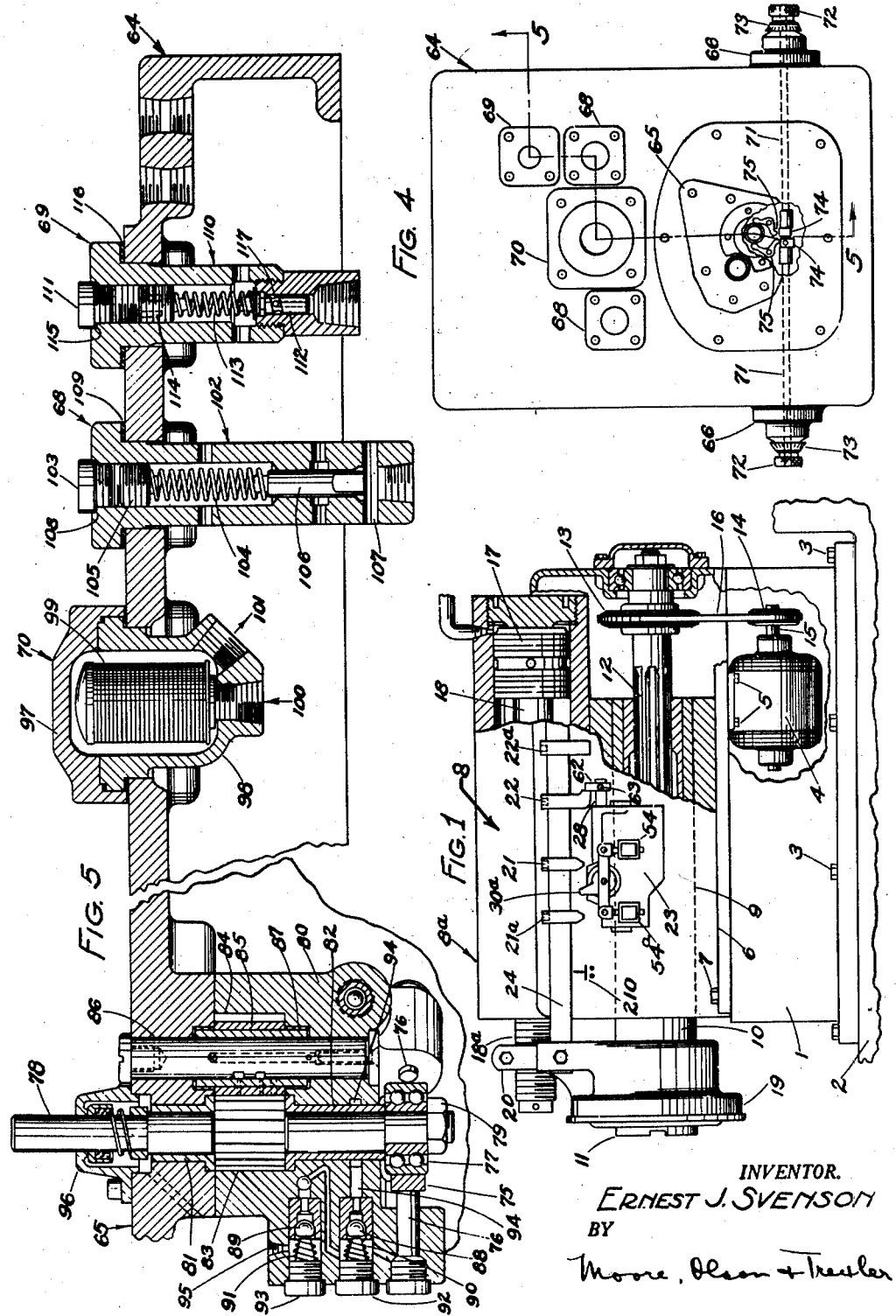
Figure 1 is a partial sectional view of the metal working structure disclosed for explanatory and structural purposes.

Referring now to the drawings in detail wherein I have designated like parts by like numerals, it will be seen that for the purpose of illustrating one practical application of my invention, without limiting the invention to said illustrating, I have disclosed said invention in connection with the metal working structure, Figure 1. This structure includes among other elements a supporting frame 1 which is adapted to be mounted in any suitable manner upon a proper support such as the base or main machine frame 2. This supporting frame 1 is secured to the support 2 by means of suitable bolts 3. The prime mover or electrical motor 4 is suitably secured to the frame 6 by means of bolts 5. The housing 6, secured to the supporting frame 1 by bolts 7, and located above the prime mover 4, supports the cylinder section 8 while the lower portion 9 of the housing 6 is arranged to receive the spindle supporting member 10. Positioned within the member 10 is the rotatable tool or work supporting spindle 11. Rotation is imparted to the spindle 11 by means of the splined drive shaft 12 which is driven from the prime mover 4 by means of the pulley member 13, rotatable with the driven end of the shaft 12. The pulley member 14, rotatable with the shaft 15 extending from the prime mover 4 is drivingly associated with the pulley 13 by V-belt 16. Of course, there are a number of other means for driving the spindle 11 as for one example see Figure 4 of the Svenson Patent No. 2,178,364, issued October 31, 1939. The spindle 11 is mounted on suitable anti-friction bearings, not shown, and for detail explanation see said Svenson Patent No. 2,178,364. The cylinder section 8 includes the piston 17 and the piston rod 18. The piston rod 18 is connected at one of its extremities to the piston 17, the piston being reciprocal within the cylinder section 8. The head portion 19 is secured to the member 10. The upper portion of the head has a split nut arrangement 20 which is engaged by the threaded end of the piston rod 18a and serves as adjusting means. Hence, the cylinder section 8 and the parts associated therewith provide a hydraulic actuator and means for shifting the spindle 11. The control cam dogs 21, 21a, 22 and 22a control automatically the feed and rapid traverse valve 23. Said control dogs are suitable mounted on a bar 24 which is suitably secured to the head portion 19 and shiftable therewith. Detail description of the valve and control dogs is to follow later in the specification.

Feed and rapid traverse valve

Figure 2:
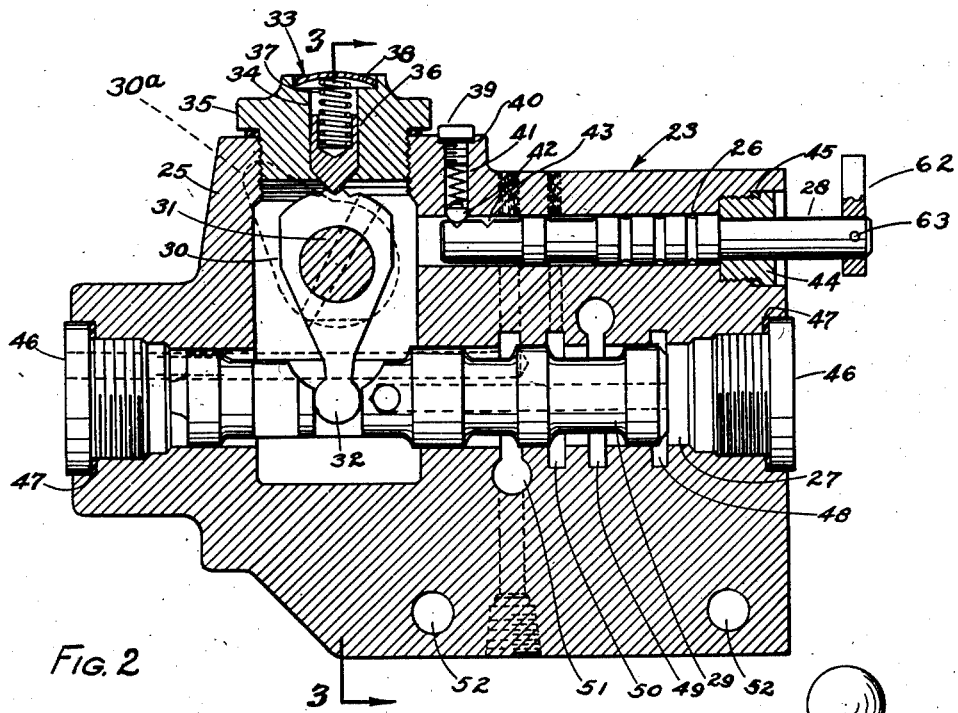
Figure 2 is a sectional view of the feed and rapid traverse valve along the line 2—2 of Figure 3.
Figure 3:
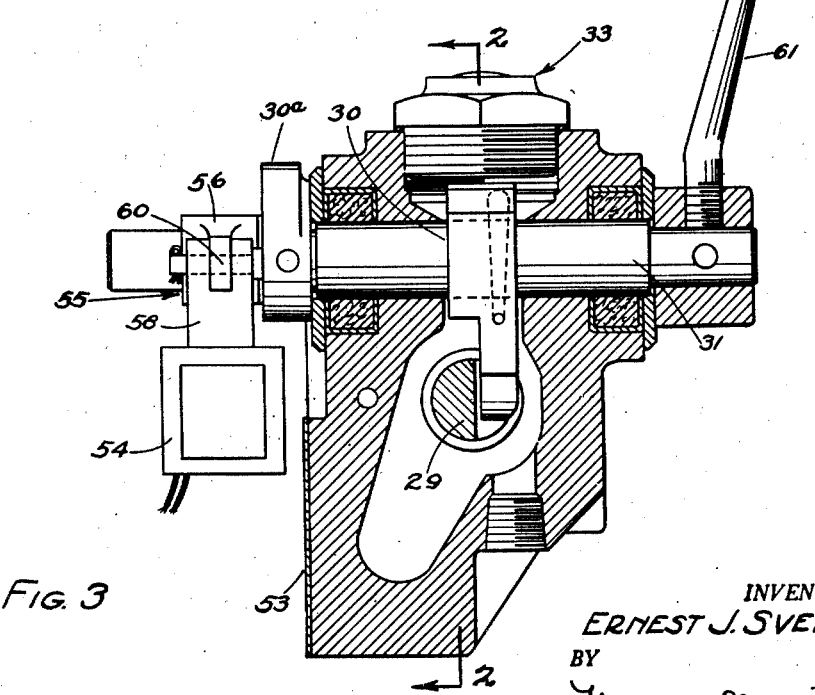
Figure 3 is a sectional view of the feed and rapid traverse valve along the line 3—3 of Figure 2.

The feed and rapid traverse valve 23, Figures 1, 2 and 3 includes among other elements the main housing 25 which has two valve piston bores 26 and 27. The valve piston bore 26 shiftably carries the control stem 28; and the valve piston bore 27 shiftably carries the main fluid control stem 29. The control finger 30 and cam 30a are suitably secured to the shaft 31 which shaft is rotatably located in the housing 25 above the valve piston bore 27. The finger-cam end 32 is shiftably associated at one end with the main control stem 29 and arranged to shift said main stem 29 to a plurality of selected positions. The opposite end of said control finger 30 is notched for engagement with the detent plunger means 33 to allow placing and temporarily holding the valve stem 29 in selected positions. The detent plunger means is shiftably mounted within the bore 34 and consists of the detent cap 35, the detent plunger 36, the detent spring 37, and spring cover 38. The spring 37 maintains the plunger detent in pretensioned relationship with the notched portion of the control finger 30 and serves to temporarily maintain said finger in predetermined positions.

For temporarily maintaining the control stem 28 in selected positions another detent means 39 is employed and consists of the screw member 40, the spring 41, the ball 42, which ball engages grooves 43 formed on the flattened end of the stem 28. The screw collar 44 and the gasket 45 serve to maintain the valve stem 28 within the piston bore 26. Cap screws 46 and gaskets 47, one at each end of the piston bore 27, serve as fluid seals. For the purpose of variously directing fluid by the main control stem 29, there are arranged within the valve piston bore 27 a plurality of ports or passages such as 48, 49, 50 and 51. Said passages are so arranged as to allow the dispatching of fluid into association with the main control stem 29 and away from said valve stem in various selected directions as will be clearly explained in conjunction with the fluid circuit, Figure 6. For mounting the valve proper a number of holes 52 are incorporated so that a suitable number of screws may be placed through said holes into a proper support for holding the valve in place. The gasket 53 is added as means to preclude fluid leakage. Further, a number of fluid seals are shown where required.

The solenoid 54 is connected to the shaft 31 by connecting means 55 which comprises the lever arm 56, supported on the shaft 31, and the bell crank 58. The operation of the solenoid 54 in relation to the valve 23 is to be described later in connection with the operation of the electrical circuit.

*Manual operation of the valve 23*

The valve is shown in its central position in Figure 2 and may be shifted to the left by manipulating the handle 61 shown in Figure 3. It may also be shifted to the right from said central position by using the aforesaid handle. That is to say, the main valve stem may be manually shifted to any selected position or positions within the valve piston bore 27. The automatic shifting of the valve stem will be described in conjunction with the fluid circuit, Figure 6. The control stem 28 may be shifted manually or by the control cam dogs 22 and 22a, Figure 1. Arm 62 is arranged for engagement by the control dogs 22 and 22a or manually by hand.

The arm 62 is supported on the free end of the control stem 28 and is rigidly retained thereon through the agency of a pin 63. Further, the detent means 39 prevents rotation of the stem. As disclosed in Figure 1, the arm 62 is positioned between the two cam dogs 22 and 22a so that one or the other of said dogs may engage and shift the arm 62.

*Fluid power panel unit*

The fluid power panel unit is disclosed in Figure 4 and in the "rolled out" showing Figure 5. It includes among other elements the supporting panel 64, the multi-flow adjustable pumping means 65, adjusting mechanisms 66, the pressure controlling valves 68, the relief valve 69, and the fluid filter 70. The adjusting mechanisms 66 (enlargement of which is disclosed in Figure 23) consists of the rotatable shafts 71, the control knobs 72, dials 73, and cam members 74. Associated with said cam members 74 are the control fingers 75. The pistons 76 are associated with each finger 75. The ball bearing 77 is eccentrically positioned on the drive shaft 78 and held in place by nut 79. The bearing 77 is drivingly associated with the fingers 75 and hence with the pistons 76.

The multi-flow pump 65 consists of the housing 80, and the drive shaft 78, which drive shaft is rotatably mounted in bearings 81 and 82. Associated with the shaft 78 is the gear 83. Within the housing 80 is the pump chamber 84. The mating gear 85 is driven by said gear 83, and the gear 85 is rotatably supported by the valve shaft 86 and the bushing 87. The gear pumping means is substantially the same as shown in my Patents No. 1,912,737 and No. 1,912,738, and reference is made to said patents for detail explanation. Another pumping mechanism is also substantially located within the housing 80. This type of pumping mechanism is described in my Patent No. 2,215,257. Therefore, it will be sufficient merely to set forth the main structure. It consists of the pistons 76, reciprocably mounted in said housing within the bores. The ball valves 88 and 89 are associated with each of the pistons and so arranged as to present each piston as an individual pumping or fluid power generating mechanism. To shiftably hold said ball valves in proper operative relation to the associated ball seat, the spring members 90 and 91 and the cap screws 92 and 93 are provided. The fingers 75 and the ball bearing 77 shift the pistons in one direction and fluid power shifts the pistons in the opposite direction. A plurality of fluid channels and the ports 94 and 95 are arranged in association with the pumping means and will be explained in conjunction with the fluid circuits. Suitable sealing means 96 is incorporated. Said sealing means is well known and needs no further explanation.

The filter unit 70, Figures 4 and 5, includes the cover 97, the housing 98, suitably secured to the supporting panel 64, and the fluid filter 99 of suitable design and suitably secured to housing 98. Passage 100 serves to allow fluid to pass into the filter 99 and the passage 101 allows fluid to pass from said filter. This arrangement allows cleaning of the filter 99 without disturbing the fluid connections 100 and 101.

The pressure controlling valve unit 68, Figures 4 and 5, includes the valve body 102, the sealing cap 103, the spring 104, the spring adjustment screw 105, the valve stem 106, and the stop pin 107. Gaskets 108 and 109 are used for sealing purpose. There are two such valves as will be explained in conjunction with the fluid circuits.

The relief valve unit 69, an enlargement of which is disclosed in Figure 22, includes the valve body 110 suitably secured to the supporting panel 64, the sealing cap 111, the valve stem 112, the spring 113, and the spring adjustment screw 114. Gaskets 115 and 116 are used for sealing purpose.

The valve stem 112 has a helical groove 117 incorporated to preclude chatter. It is apparent that the orifice created when the stem opens increases with the degree of opening.

*Feed and rapid traverse fluid circuit*

Figures 6 to 8, inclusive, show, among other elements, the feed and traverse valve as fully described in connection with Figures 2 and 3. The circuit disclosed in Figure 6, includes among other elements the multi-flow adjustable pumping means 65, disclosed in Figures 4 and 5. The gear section 118 of pumping means 65 delivers fluid from the reservoir 119 through the conduit 120 to the diverting pressure control valve 68 and to the port 50, through annular passage 122 to port 49, the fluid then flows through conduit 123 into one end of the actuator 8a. The fluid is returned from the other end of the actuator through the conduit 124 into the port 51 of the valve 23. When the main control stem 29 is in feed position, Figure 6, the port 51 is blocked and the fluid passes through the conduit 124 and 125 to the intake port 94 of the piston pump section 126 of pumping means 65, Figures 4 and 5. The amount of fluid metered through the piston section 126 is according to the volume displaced by the piston or pistons 76. One or more pistons may be employed, depending upon the requirement. The load valve 69 serves to balance the return fluid pressure when a plurality of actuators are actuated from a single pump device such as the gear section 118. The fluid actuator 8a reciprocates the head 19, accordingly the tool 128 is actuated.

At the termination of the feed stroke the stem 28 is shifted inwardly by dog 22a until communication is made between ports 50a and 51a by communicating passage 52a. When the above condition is maintained, the fluid is conducted through the port 50a across the passage 52a, through the port 51a, the passages 53a, 54a, 55a, and into the valve end chamber 56a whereby the pressure of the fluid is sufficient to force the main control stem into its return position. Just before completion of the return travel of the main control stem, the stem 28 contacts the cam dog 22 whereby the stem 28 is reset in its balanced condition.

Referring to Figure 7, the main control stem 29 is shown in the rapid approach position. In this position the fluid is delievered from the gear section 118 through the conduit 120, the port 50 through annular passage 122 to the port 49; the fluid then flows through conduit 123 into the right end of the actuator 8a forcing the piston 17 to the left. The fluid is returned from the left end of the actuator 8a through the conduit 124 into the port 51 of the valve 23 through annular passage 129 to the port 50 and adding to the fluid delivered from the gear section 118. There is a differential in areas between the left end and the right end of the piston 17 within the actuator 8a. Accordingly more fluid must be delivered into the cylinder than is exhausted when shifted in a given direction. The invention proposes that the exhaust fluid be directed through the pressure conduit into the propelling end of the fluid actuator when the piston travels in a given direction for the purpose of added speed of actuation.

Figure 8 shows the main control stem 29 in the rapid return position. In this position the fluid is delivered from the gear section 118 through the conduit 120, the port 50 through annular passage 129 to the port 51; the fluid then flows through the conduit 124 into the left end of the actuator 8a shifting the piston 17 rapidly to the right. The exhaust fluid is conducted from the right end of the actuator 8a through the conduit 123, the port 49, through annular passage 130 to the port 48; the fluid then flows through return conduit 131 which communicates with the reservoir 119.

It is clear from the description of Figures 6, 7, 8 and other figures that the structure of the fluid actuator, having a differential area associated with the control means during the feeding, the single piston in the pumping means 65, and the novel design of the valve structure 23 present a simplified and accurately controlled fluid transmission. That is to say: the selection of a suitable area for the piston rod 18 in relation to the actual force required for rapid traverse of a given structure, presents a differential arrangement, using a very small amount of propelling fluid for rapid speed and a minimum of fluid for controlling the feeding speed of the actuator. Further, it allows empolying a control valve of the simplest and smallest structure. In fact, the complete arrangement serves as an extremely speedy actuation for rapid traverse in both directions and an inexpensive design as far as controlling the feeding movement. By suitably constructing the return conduit 125 as shown in Figures 6 and 16, the pulsative action caused by using a single piston for control is, for practical purposes, eliminated. In the actual use and design of the structure, the return conduit 125 is so constructed as to present a device wherein the known velocity of sound pertaining to such material as steel in comparison with such substance as oil has been taken into careful consideration for the purpose of reducing the pulsative effect of a single piston to a practical limit. That is, one frequency of vibration is employed to substantially cancel another frequency of vibration present in the structure. It can be seen that I use fluid of a suitable "fluid column length" to obtain a very slight resilient action due to variation in pressure. The phenomenon of the velocity of sound is used as formula for obtaining proper design of the various elements and the material involved. Hence, the structure explained lends itself as a simplified fluid transmission. Heretofore, not only the size of a common fluid transmission but the cost and the physical embodiment of the structure as a whole has precluded its use in a great number of places.

*Orifice feed valve associated with the fluid circuit Figure 9*

The orifice feed and traverse valve 23a is shown associated with the fluid circuit, Figure 9. This valve includes the housing 25a which has three valve piston bores 26a, 27a and 132. The valve bore 26a carries the control stem 28a similar to the control stem 28, Figures 2 and 3. The supporting shaft 31a is positioned to the left of said control stem 28a similar to the supporting shaft 31, Figures 2 and 3. The valve bore 27a carries the main control stem 29a similar to the control stem 29, Figures 2 and 3. The valve bore 132 carries the orifice control stem 133. This stem is not present in the valve 23. The finger 30a is suitably secured to the shaft 31a and has the contact end 32a associated with the main control stem 29a similar to the finger 30, Figures 2 and 3. The orifice control stem 133 is retained in the valve bore 132 by the screw collar 135. Said stem 133 presents adjustable means to vary the size of the orifice 136. It includes the V-shaped notch 137 and an opening 138. The stem may be adjusted by turning the dial 139 using the control knob 140. The locking knob 141 adjacent to said knob 140 is employed to lock the orifice stem in the place of the adjustment. Figures 10, 12 and 13 and the automatic function are to be explained in conjunction with the fluid circuit proper. Further, the actuation of the valve is the same as explained pertaining to the valve 23.

*Orifice feed and control circuit*

The circuit, Figures 9, 10 and 11, includes among other elements, the gear pump 142 which delivers fluid from the reservoir 143 at a pressure determined by the diverting valve 144 of similar design as valve 68. In one position of the valve this fluid is conducted through the conduit 145 to the valve port 146 flowing across the annular passage 147 to the valve port 148 which port communicates with the conduit; and then the fluid passes through the conduit 149 to the right end of the actuator 8a, Figure 9. The exhaust fluid is conducted through the conduit 150 which communicates with the port 151, and the fluid flows across the fluid passage 152 to the valve passage 153 which port communicates with the speed control orifice 136. The fluid then passes through the hole 138 and is delivered through the passage 155 in the stem to a port 156, then flowing through the passage 157 into the port 148 where the fluid is added to the fluid from the pump 142. Hence, the pressure in the return end is higher than the propelling pressure. In a modified structure, Figure 13, the exhaust fluid is delivered through the passage 155 and flows back to the reservoir 143 through conduit 154. In this case the fluid is maintained at a suitable pressure for control purpose. The pressure control valve 69a is employed for said control purpose. At the termination of the feed stroke the stem 28a is shifted by similar means and in similar manner as stem 28.

Figure 10 shows the main control stem 29a in approach traverse position. The fluid is delivered from the gear pump 142 through the conduit 145 to the valve port 146. The fluid then passes across the fluid channel 147 to the port 148, then flows through the conduit 149 to the right end of the actuator 8a. The exhaust fluid is conducted from the left end of the actuator 8a through the conduit 150 to the valve port 151. Attention is directed to the fluid passage 153 which is blocked when the main control stem is in the approach traverse position. Therefore, the fluid passes across passage 160 adding to the fluid from the gear pump 142. There is a differential in areas between the left end and the right end of the piston within the actuator. Accordingly, more fluid must be delivered into the cylinder than is exhausted when shifted in a given direction. The invention proposes that the exhaust fluid be directed through the pressure conduit 149 into the propelling end of the fluid actuator when the piston travels in a given direction.

Figure 11 shows the main control stem in the return traverse position. Fluid is delivered by the gear pump 142 through the conduit 145 to the valve port 146. The fluid then flows from the port 146 across the fluid passage 160 to another valve port 151. The port 151 in turn communicates with the conduit 150 which conducts the fluid to the left end of the actuator 8a causing the piston 17 to shift rapidly to the right. As the piston 17 shifts to the right the fluid in the right end of the actuator passes out through the conduit 149. This fluid flows from conduit 149 to the valve port 148. Attention is directed to the fluid passage 153 which is blocked when the main control stem 29a is in its return traverse position. Therefore, the fluid passes across the passage 161 to the valve port 162 into the conduit 163 and flows to the reservoir 143.

If it should be desirable to use part of the piston stroke only, a screw 160a may be added. It is clear that the piston 17 may be suitably stopped by said screw 160a at a desired point in its return travel. Packing 161a and nut 162a are employed for sealing purposes.

*Indexing valve unit*

Figure 14:
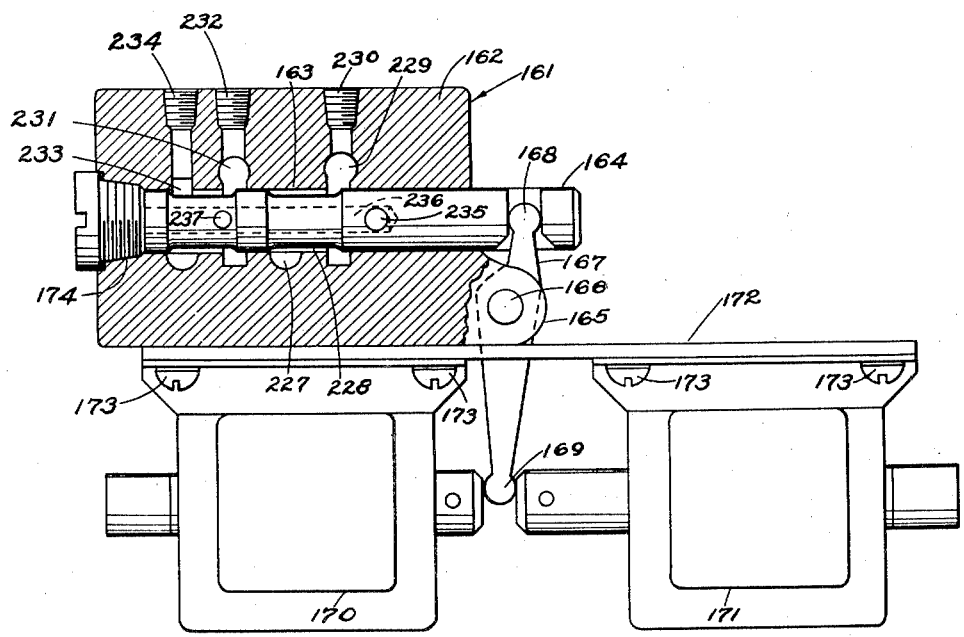
Figure 14 is a sectional view of the indexing valve and its associated electrical actuators.
Figure 15:
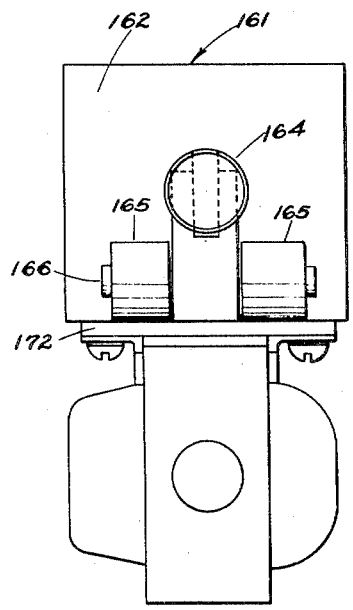
Figure 15 is a partial right end view of the valve structure disclosed in Figure 14.

The indexing valve unit 161 is employed for controlling the shifting of the work holding means Figure 17, and is disclosed in Figures 14 and 15, and includes the valve body 162 having the valve bore 163 which carries the valve control stem 164. The valve body has a pair of equally spaced bosses 165, see Figure 15, said bosses supporting the pin 166. The control finger 167 is rotatably mounted on said pin 166 and has a contact section at each end. The contact 168 is suitably associated with the valve stem 164. The contact end 169 is placed between two electrical actuators such as solenoids 170 and 171. Said solenoids are suitably secured to the support 172. The support 172 is in turn secured to the valve body 162 by suitable screws 173. The control stem 164 is limited in its movement in one direction by the screw 174, and shiftably maintained by the finger 167 and the solenoids 170 and 171. The valve bore 163 and the valve body 162 have a plurality of ports and passages for the purpose of receiving and dispatching fluid power.

Fluid is received through the conduit 227 by the port 228 and is dispatched either to the port 229 which is associated with the conduit 230 or to the port 231 which is associated with the conduit 232. Fluid is returned from port 233 through the conduit 234. Return fluid from the port 229 passes through the passage 235 in the valve stem 164, longitudinal passage 236 and another passage 237 also in the valve stem. This phase will be explained when the fluid circuit disclosed in Figure 17 is described. Further, the valve may be controlled manually.

*Indexing mechanism*

The indexing mechanism 175, Figure 17, operates to index the work support 176, whereby work pieces are presented in alignment with the material cutting tool or tools. The indexing mechanism is similar to the indexing structure disclosed in my Patent No. 2,078,698 and may be suitably constructed for any required purpose. Indexing mechanisms of this type are designed to support and shift work pieces arranged for a plurality of metal removing operations.

The shifting of the work support 176 is performed by the hydraulic actuator 177, which includes the cylinder 178 and the piston 179 relatively reciprocable therein. The piston rod 180 extends from the piston 179 and is provided with rack teeth 181, which teeth are adapted to mesh with companion teeth within the quadrant 182. Fluid from the reservoir 119 is delivered by the gear pump 118, through the conduit 183 to the index valve 161 (disclosed in detail in Figures 14 and 15) and directed through ports or passages in said valve to a conduit 184 at the right end of the hydraulic actuator 177. Shifting of the work support 176 takes place in a step by step manner. Fluid from the left end of the cylinder 178 passes through the conduit 185, the valve and another conduit 186 to the reservoir. If required, an independent source of fluid power may be used for indexing, as for one example see the Svenson Patent No. 2,078,698, issued April 27, 1937. The automatic control will be explained later.

*Tool actuation—and indexing fluid circuit*

Figure 16 discloses the hydraulic circuit for a plurality of actuators. The valve 23 is also disclosed in Figures 2 and 3. The fluid actuators are shown in details in Figures 1 and 6. Delivering of fluid from the gear pump section 118 (comprising gears 83 and 85, Figure 5) to the valves 23 and actuators 8a is similar and is explained in Figure 6. Hence, the explanation of one structure serves to explain both actuators.

*Operation of the indexing structure*

The indexing of the work support 176' occurs usually at the end of the return traverse of the tool actuator 8a or actuators. For controlling the indexing of the work support 176' the valve 161 is suitably shifted causing the actuator 177 associated with said work support 176' to move in the selected direction. Referring to Figure 16 the fluid is delivered from the gear section 118 to the diverting valve 68 and then into the load valve 176 which is of similar structure as valve 68. This load valve is added for the indexing structure. This second valve 176 is set at a pressure sufficient to move the actuator 177 or actuators for shifting the indexing means. The fluid is further conducted through the conduit 190 into the branch conduit 183 leading to the index valve 161. The fluid is then received from said conduit 183 by the index valve and directed through the valve passages and conduit 184 into the upper position of the work indexing actuator 177. The exhaust fluid is returned from the upper position of the actuator 177 through the conduit 185, the exhaust port in the valve 161, and the conduit 186 back to the reservoir. By reversing the fluid flow to the cylinder through the indexing valve the actuator is shifted in a reverse direction.

The second indexing mechanism shown in Figure 16 and designated with prime numbers, including the index valve 161' and the indexing circuit, is similar to the first indexing mechanism described and may be used with said first one or may be omitted.

*Structure and operation of the electrical circuit*

Figure 18 is a diagram of the electrical control circuit for the two work indexing means and the two tool supporting units disclosed in Figure 16. It is understood that each indexing table and each tool supporting unit may be operated individually. The tool unit drive motors (such as motor 4, Figure 1) and the pump drive motors are usually of the three phase induction type and are associated with the control circuit, Figure 18, in well known manner. It should be understood that any type of electric motor or like driving means is applicable and that I do not limit myself to any specific type of driving motor. Electric power is supplied to the control circuit from the transformer 190, which transformer is of well known structure. Said transformer is suitably connected to the power supplying lines and its purpose is to deliver selected voltage to the push buttons and other control elements.

The selector switch 191 has three positions and controls which one of the tool supporting unit motors is to be actuated or controls the number of units to be actuated. When the selector is in the central position of the switch 191 both the tool unit motors may start and when in either of the other two positions only the one tool unit motor corresponding to that position may start.

As all the elements of the control circuit are of well known structure, it is deemed sufficient for proper understanding to describe the functioning of these elements as the cycle of operation progresses. I will first describe the circuit with the switch 191 in its central position. The operation is started by actuating the push button 192. This actuation energizes the magnetic starter coils 193, 194 and 195 which coils cause the starting of the pump drive motor, the left head unit electric motor, and the right head unit electric motor, respectively. The coil 193 also closes the holding contact 196 which shunts the push button 192 and maintains the coils 193, 194 and 195 energized after the push button 192 is released. The coolant pump drive motor is started by actuating the push button 197 which energizes magnetic starter coil 198. The holding contact 198a maintains the coil 198 energized after the push button 197 is released. The coolant pump may or may not be required.

Before the left head unit may perform its automatic cycle the work indexing mechanism 175, Figure 17, must be in its start cycle position as indicated by the limit switch 199 having its contacts 200 closed as shown in Figure 17. Also, the left head unit must be in its returned position so that limit switch 201 is actuated and its contact closed. The limit switch 201 may be actuated from action of the fluid motor. The relay coil is now energized and the associated contacts 203, 204 and 205 are closed. The starting switch 206 is actuated; this action energizes the solenoid 170 which shifts the index valve 161, Figures 14 and 17, and causes the index mechanism to index the work support one station. During the indexing operation the limit switch 199 is actuated and contacts 200 open. The relay coil 202 is not deenergized by the operation of the limit switch 199 because the holding contact 203 maintains the coil energized. When the indexing motion is completed the rod 180, Figure 17, operates the limit switch contact 208. This completes a circuit through limit switch 201, Figure 18 and relay contacts 205 to energize the solenoid 54 which shifts the valve 23, Figure 3, to cause the left head unit to approach the work at rapid traverse. Another solenoid 54a, Figure 1, may be employed to shift the valve in the opposite direction. As the unit begins its approach, it releases the limit switch 201 opening the contact. Opening the contact deenergizes the starting solenoid 54 and deenergizes the relay coil 202 whose contacts 203, 204 and 205 open.

When the tool unit has traversed a preselected distance, a cam dog 21, Figure 1, mechanically shifts the control valve to feed position, Figure 6, and the tool support is operated at feeding speed. When said support has fed the proper distance, a cam dog 21a operates the limit switch 210 closing the contact and completing the circuit to energize the relay coil 211 (limit switch contact 200 is still released), which closes its contacts 212 and 213, Closing contacts 212 completes a holding circuit for relay 211 after limit switch 210 is released later in the cycle. At the same time the limit switch 210 was operated a cam dog 22a (Figure 1) mechanically shifted the head unit control valve stem 28 to the reverse and said unit returned to the original or starting position. When the head unit is fully returned its control valve stem 28 is mechanically reset through dog 22 (Figure 1) and the limit switch 201 is again operated to close its contact. This completes a circuit through contacts 213 of the relay 211 to energize the solenoid 171. The solenoid 171 shifts the valve 161, Figure 17, which causes the index cylinder to be returned to its left hand position. The return of the index cylinder operates limit switch 199 so as to close its contact 200 and open its contact 208. The operation of the limit switch 199 drops out relay 211 and again picks up relay 202. Opening of contacts 213, by the dropping out of relay 211, deenergizes the index return solenoid 171.

The closing of contacts 204 by the reoperation of relay 202 completes the circuit to again energize the solenoid 170 which shifts the valve 161, Figure 17, to advance the index table one more station. From this point, another cycle continues exactly as previously described. Such cycles are repeated one after the other automatically as long as the starting switch 206 remains closed.

When so required the motors may all be stopped by actuating the emergency push button 216 which drops out all the motor starters. Stopping the pump drive motor automatically ends the hydraulic actuation.

The operation of the right head is accomplished by closing the switch 206' which will energize the solenoid 170' and start the indexing function of the right indexing table. The operation then proceeds exactly acording to the above description if the primed numerals are read in place of the corresponding unprimed numerals and if the word "right" is substituted everywhere for the word "left."

If there are two operators, each unit may be started and stopped independently at the will of the respective operators. If one operator is operating both units, he may start the two simultaneously or he may wish to start one a little later than the other so that one unit is performing its function while he is loading the other. A single starting switch may be provided with independent contacts inserted in place of 206 and 206' as for one example structure manufactured by Mackworth G. Rees, Inc., Detroit, Michigan. Actuating such a switch would serve to effect simultaneous starting of both units from one switch actuation.

In some cases it may be desirable to perform repeated operations of either tool head without any indexing movements. To do this, the switch 208 or 208' is manually closed and the switch 206 or 206' is left open. With matters so arranged, actuation of the push button 217 or 217' will cause the associated tool head to advance, feed and return, but there will be no actuation of the indexing mechanism.

*Four piston multi-flow pump*

The pump 65a, Figures 19 and 20, is a modification of the pump 65, Figures 4 and 5, and consists of among other elements, the pump housing member 80', and the drive shaft 78' rotatably mounted in bearings 81' and 82'. Suitably associated with the shaft 78' is the gear 83'. The mating gear 85' is driven by said gear 83' and rotatable on shaft 86'. The pump operates substantially as described in my Patents No. 1,912,737 and No. 1,978,480. Therefore, to understand its operation it will be sufficient to only set forth the general structure. Associated at one end of the drive shaft 78' is the oil seal 96'. This seal is substantially as explained pertaining to Figure 5. A control finger 75' contacts a portion of the outer surface of the eccentric bearing 77'. This finger is also in contact with a piston 76' which reciprocates in accordance with the movement of the bearing 77' when rotating with the shaft 78'. The operation of the finger and piston structure is substantially as that described in Figure 5 and has previously been described in other patents, for example: Patent No. 2,215,257. The numeral 218 designates a piston cap, threadedly engaging the pump housing. The numerals 88' and 89' have reference to control or ball check valve units which govern the fluid intake and discharge from the piston chamber. The operation is clearly set forth in the above said Patent No. 2,215,257 and Figure 5 of this application.

The adjusting mechanism 219, disclosed in Figure 21, is usually provided for each control finger 75' and includes the shaft 220 rotatably supported in one of the pump housing members 80', one end of said shaft 220 is squared at 221 providing an easy contacting surface for suitable means to rotate shaft 220. More than one piston may also be controlled from a single member. The shaft 220 also includes a threaded portion 222. Intermediate the squared portion 221 and the graduated collar 223, is the locking nut 224 securing the shaft 220 against rotation. Integral with the other end of shaft 220 is the eccentric finger contact 225. This contact 225 extends within one of the housing members 80' and contacts the finger at 226. Hence, the eccentric controls the amount of shifting of the piston 76. Each of the other pistons is similarly controlled.

The pump may be used in a circuit as shown in Figure 16 when more than one piston is required to control the actuator. Further, the pump may be used in circuits having four actuators. The number of pistons may be varied to suit the number of actuators. The intake and outlet to each piston may be arranged as shown in Figures 4 and 5. Further, two or more pistons may be arranged to connect the inlet and outlet.

In explaining my invention, I have set forth one practical disclosure of the structure. Describing said structure, I have addressed those skilled in the art in a manner as to build the structural foundation for said skilled craftsmen to employ the invention in a great number of various combinations. Attention is directed to the fact that each structure, operating as a unit, has been described separately and it is believed unnecessary to further describe each possible combination of said unit structure, as the usefulness and the possible modification is adequately brought out in setting forth, as stated above, one practical disclosure.

I claim:

1. In a fluid control system, in combination with a fluid actuator, valve means and associated conduits for dispatching propelling fluid to said actuator and for receiving fluid therefrom, said valve means including means operable when the actuator is propelled in a predetermined direction for feeding return fluid from the actuator to the propelling side of the actuator in a recirculation circuit, a feed rate control orifice arranged in said circuit for controlling the feeding rate of said actuator, and means operable in response to the size variation of the feed rate control orifice for correspondingly varying the fluid input to the actuator.

2. In a fluid control system, said control system having pumping means for fluid and a fluid operated actuator, valve means and associated conduits for dispatching propelling fluid from the pumping means to said actuator and for receiving fluid from the actuator, said valve means including means operable while the actuator is propelled for feeding return fluid from the actuator to the propelling side of the actuator in a recirculation circuit, a feed rate control orifice arranged in said circuit on the return side of the actuator for controlling the feeding rate of said actuator, and means operable in response to the size variation of the feed rate control orifice for correspondingly varying the fluid input to the actuator.

3. In a fluid control system, said control system having pumping means for fluid and a fluid operated actuator, valve means and associated conduits for dispatching propelling fluid from the pumping means to said actuator and for receiving fluid from the actuator, said valve means including a valve housing and a shiftable valve member in the housing having cooperative passages operable during movement of the actuator for feeding return fluid from the actuator to the propelling side of actuator in a recirculation circuit, an adjustable feed rate control orifice arranged in said valve passages and in said recirculation circuit on the return side of the actuator for controlling the feeding rate of said actuator, and means operable in response to the adjustment of the feed rate control orifice for correspondingly adjusting the fluid input to the actuators.

4. In a fluid control system, pumping means for fluid, means for maintaining the delivery pressure of the pumping means substantially constant, a fluid operated actuator, valve means and associated conduits for dispatching propelling fluid from the pumping means to said actuator and for receiving fluid from the actuator, said valve means including means operable while the actuator is propelled for feeding return fluid from the actuator to the propelling side of the actuator in a recirculation circuit, and feed rate control orifice arranged in said circuit on the return side of the actuator for controlling the feeding rate of said actuator.

5. In a fluid control system, pumping means for fluid, means comprising a diverting valve set to divert fluid from the pumping means at a predetermined pressure for maintaining the delivery pressure of the pump substantially constant, a fluid operated actuator, valve means and associated conduits for dispatching propelling fluid from the pumping means to said actuator and for receiving fluid from the actuator, said valve means including means operable while the actuator is propelled for feeding return fluid from the actuator to the propelling side of the actuator in a recirculation circuit, a feed rate control orifice arranged in said circuit on the return side of the actuator for controlling the feeding rate of said actuator, and means for causing the return fluid to by-pass said feed rate control orifice so as to render said orifice functionally ineffective.

6. In a fluid control system, pumping means for fluid, means comprising an adjustable diverting valve set to divert fluid from the pumping means at a predetermined adjustable pressure for maintaining the delivery pressure of the pump substantially constant, a fluid operated actuator, valve means and associated conduits for dispatching propelling fluid from the pumping means to said actuator and for receiving fluid from the actuator, said valve means including means operable while the actuator is propelled for feeding return fluid from the actuator to the propelling side of the actuator in a recirculation circuit, and a feed rate control device arranged in said recirculation circuit on the return side of the actuator for controlling the feeding rate of the actuator and the diversion through said diverting valve.

7. In a fluid control system, said control system having pumping means for fluid and a fluid operated actuator, said actuator comprising a cylinder and piston structure wherein a piston rod extends in one direction only from the piston, valve means and associated circuits for dispatching propelling fluid from the pumping means to said actuator cylinder so as to propel the piston in a direction extending toward said piston rod, and for receiving fluid from the actuator cylinder from the piston rod end thereof, said valve means including means operable while the piston is so propelled for feeding the return fluid from the actuator cylinder to the propelling side of the actuator cylinder in a recirculation circuit, a feed rate control orifice arranged in said circuit on the return side of the actuator for controlling the feeding rate of said piston, and means operable in response to the size variation of the feed rate control orifice for correspondingly varying the fluid input to the actuator.

8. In a fluid control system, said control system having pumping means for fluid and a fluid operated actuator, valve means and associated conduits for dispatching propelling fluid from the pumping means to said actuator and for receiving fluid from the actuator, said valve means including means operable while the actuator is propelled for feeding return fluid from the actuator to the propelling side of the actuator in a recirculation circuit, a feed rate control orifice arranged in said circuit on the return side of the actuator for controlling the feeding rate of said actuator, means operable in response to the size variation of the feed rate control orifice for correspondingly varying the fluid input to the actuator, and said valve means also including means for causing the return fluid to by-pass said feed rate control orifice so as to render said orifice functionally ineffective.

9. In a fluid control system, a gear pump for fluid, means comprising a diverting valve set to divert fluid from the pump at a predetermined pressure for maintaining the delivery pressure of the pump substantially constant, a fluid operated actuator, said actuator comprising a cylinder and piston structure, valve means and associated conduits for dispatching propelling fluid from the pumping means to said actuator and for receiving fluid from the actuator, said valve means including means for reversing the direction of travel of the actuator, and means operable while the actuator is propelled in at least one direction for feeding the return fluid from the actuator to the propelling side of the actuator in a recirculation circuit, a feed rate control orifice arranged in said circuit on the return side of the actuator for controlling the feeding rate of said actuator, and said valve means also including means for causing the return fluid to by-pass said feed rate control orifice to render said orifice functionally ineffective and increase the speed of said actuator.

10. In a fluid control system, pumping means for fluid, means comprising a diverting valve set to divert fluid from the pumping means at a predetermined pressure for maintaining the delivery pressure of the pump substantially constant, a fluid operated actuator, valve means and associated conduits for dispatching propelling fluid from the pumping means to said actuator and for receiving fluid from the actuator, a feed rate control orifice arranged on the return side of said actuator for receiving fluid from the actuator and for controlling the feeding rate thereof, and means for maintaining the fluid on the approach side of said orifice at a higher pressure than the pressure of the fluid in the propelling end of the actuator while said feed rate control orifice remains functionally operative and during movement of said actuator.

ERNEST J. SVENSON.

REFERENCES CITED

The following references are of record in the file of this patent:

UNITED STATES PATENTS

| Number | Name | Date |
| --- | --- | --- |
| 1,578,233 | Ferris | Mar. 23, 1926 |
| 1,719,693 | Ernst | July 2, 1929 |
| 1,835,976 | Ernst et al. | Dec. 8, 1931 |
| 1,905,094 | Hirvonen | Apr. 25, 1933 |
| 1,905,133 | Bishop | Apr. 25, 1933 |
| 1,924,738 | Flanders | Aug. 29, 1933 |
| 1,969,063 | Ernst et al. | Aug. 7, 1934 |
| 1,983,900 | Ferris et al. | Dec. 11, 1934 |
| 1,985,443 | Clute | Dec. 25, 1934 |
| 1,986,862 | Svenson | Jan. 8, 1935 |
| 1,990,052 | Sosa | Feb. 5, 1935 |
| 2,000,553 | Alden | May 7, 1935 |
| 2,005,018 | West et al. | June 18, 1935 |
| 2,005,731 | Ernst et al. | June 25, 1935 |
| 2,013,420 | Opel | Sept. 3, 1935 |
| 2,028,766 | Ernst et al. | Jan. 28, 1936 |
| 2,036,162 | Svenson | Mar. 31, 1936 |
| 2,079,640 | Vickers et al. | May 11, 1937 |
| 2,084,562 | Schaefer | June 22, 1937 |
| 2,125,641 | McKee et al. | Aug. 2, 1938 |
| 2,160,217 | Kingsbury | May 30, 1939 |
| 2,166,423 | Clark | July 18, 1939 |
| 2,178,364 | Svenson | Oct. 31, 1939 |
| 2,178,915 | McKee et al. | Nov. 7, 1939 |
| 2,187,257 | Williams | Jan. 16, 1940 |
| 2,190,284 | Foschie | Feb. 13, 1940 |
| 2,212,920 | Kerr | Aug. 27, 1940 |
| 2,262,432 | Rodder et al. | Nov. 11, 1941 |